Patented Mar. 19, 1929.

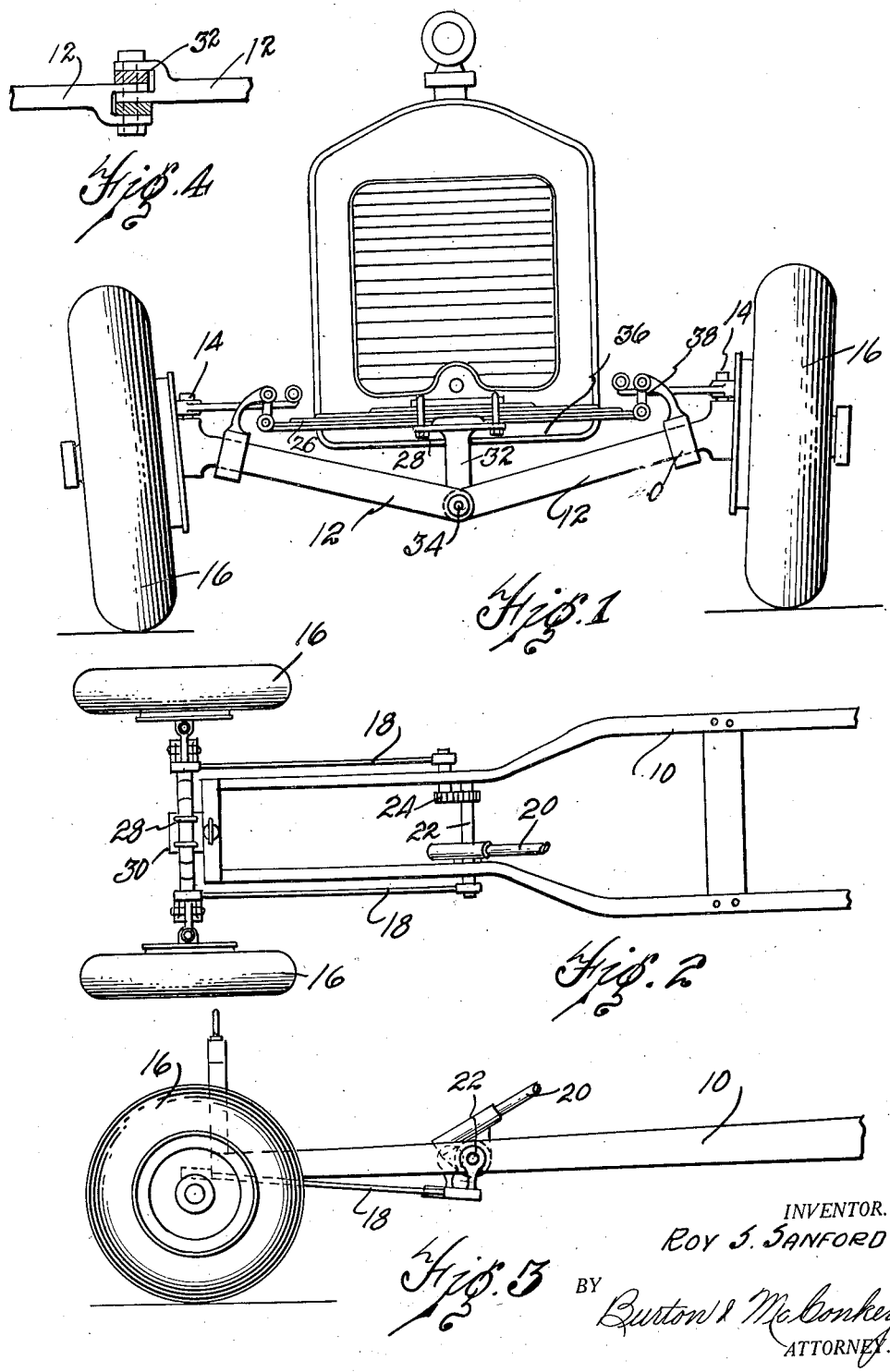

1,705,785

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

VEHICLE AXLE.

Application filed April 16, 1927. Serial No. 184,291.

My invention relates to an improved axle construction particularly adapted for employment as the front axle of an automobile.

The object is to provide an axle formed in two pivotally supported sections so arranged and constructed as to increase the riding comfort of the vehicle, its ease of operation and its stability on the road. A meritorious feature lies in the fact that with my improved axle when one road wheel of the vehicle passes over a bump in the road, one-half of the axle rises up and only one-half of the weight is unsprung weight. The axle sections are supported so that the support therefor takes the torque thereof answering the purpose of the usually provided torque tube.

There is a distinct snubbing effect due to the lateral travel of the tire as one axle section pivots upon its support which adds to the security and comfort of road travel. In making a turn there is a tendency for the wheel on the outside to straighten up due to the throw of the weight of the car in such direction.

Many other advantages and important features of my improvement will further appear from the following description, appended claims and accompanying drawing, wherein:

Fig. 1 is a front elevation of a vehicle provided with my improved axle.

Fig. 2 is a plan of one end of a vehicle frame fitted with my improvement.

Fig. 3 is a side elevation of the forward end of the vehicle provided with my improved axle.

Fig. 4 is a fragmentary plan of the pivotal mounting of the axle sections.

Let 10 indicate a vehicle frame assembly. My improved axle is positioned at one end of the frame. The axle comprises two axle sections each indicated as 12, which are substantially of the same length. Each axle section is provided with a steering knuckle assembly 14 and a road wheel 16. Suitable operating connections 18 lead from the steering knuckle assembly to a steering post 20. Any convenient type of steering mechanism adaptable may be used but I have shown a worm driven shaft 22 which, through suitable gears such as 24 and a connection from the shaft 22, is employed to swivel the steering knuckles upon the axle.

The front end of the frame is spring supported upon the axle and I have here shown a spring 26 which is fastened intermediate its ends by clamps 28 to a supporting member 30 carried by the vehicle frame at 36. This supporting member is provided with a downwardly projecting portion 32 which carries a short shaft or fulcrum 34 upon which the two inner ends of the axle sections 12 are pivotally mounted to swing vertically.

These two axle sections are pivotally connected together and a suitable manner of accomplishing this is shown in Fig. 4. Opposite ends of the spring 26 are secured to the opposed axle sections 12 in a satisfactory fashion as by means of shackles 38 and brackets 40. Not only does my improved axle structure add to the comfort of riding in the vehicle equipped therewith but it insures greater stability of the vehicle upon the road and adds to the ease of its operation.

In the type of construction here illustrated there is a tendency when the car goes around a curve, particularly at a high rate of speed, for the wheel on the outside to strain up due to the throw of the car and to relieve somewhat the stress on the wheel and particularly on the tire which otherwise tends to roll inwardly.

What I claim is:

1. A vehicle front axle assembly and body support comprising, in combination with the body, a body supporting member secured to the front end of the body substantially midway thereof and extending downwardly therebelow, a pair of axle sections pivoted to the lower end of the supporting member extending in opposite directions upwardly and outwardly therefrom and each provided on its outer end with a road wheel, and a spring secured midway its ends to the upper end of the supporting member spaced above the pivotal connection of the axle sections therewith and shackled at its ends to the outer ends of the axle sections whereby the body is swung within the angle formed between the axle sections.

2. A vehicle front axle assembly and body support comprising, in combination with the body, a body supporting member secured to the front end of the body substantially midway thereof and extending downwardly therebelow, a spring secured substantially midway its ends to the support, a pair of axle sections pivoted to the support below the point of attachment of the spring thereto extending outwardly and upwardly therefrom toward the spring and connected beyond the ends of the spring by shackles to the spring to suspend the body between the axle sections and the spring and within the angle formed between the axle sections.

In testimony whereof, I, ROY S. SANFORD, sign this specification.

ROY S. SANFORD.